(12) United States Patent
Gregoire, Sr.

(10) Patent No.: US 6,357,809 B1
(45) Date of Patent: Mar. 19, 2002

(54) GRASPING IMPLEMENT

(76) Inventor: Paul E. Gregoire, Sr., 7402 Shrimpers Row, Dulac, LA (US) 70353

( * ) Notice: Subject to any disclaimer, the term of this patent is extended or adjusted under 35 U.S.C. 154(b) by 0 days.

(21) Appl. No.: 09/691,734

(22) Filed: Oct. 18, 2000

(51) Int. Cl.[7] .............................. A01B 1/00; B25J 15/00
(52) U.S. Cl. ..................................... 294/19.1; 294/50.9
(58) Field of Search ........................... 294/1.4, 11, 19.1, 294/19.2, 50.6–50.9, 55, 104, 115; 56/400, 12

(56) References Cited

U.S. PATENT DOCUMENTS

| | | | | | |
|---|---|---|---|---|---|
| 2,328,870 | A | * | 9/1943 | Willman | 294/55 |
| 2,463,184 | A | * | 3/1949 | Koepke | 294/50.8 X |
| 2,942,401 | A | * | 6/1960 | Napoli | 294/50.9 X |
| 3,264,809 | A | * | 8/1966 | Jackson | 294/50.9 X |
| 3,328,066 | A | * | 6/1967 | Johnston | 294/19.1 |
| 3,601,966 | A | * | 8/1971 | Kerry | 294/50.9 X |
| 4,143,899 | A | * | 3/1979 | Wetherall et al. | 294/50.9 |

* cited by examiner

Primary Examiner—Johnny D. Cherry
(74) Attorney, Agent, or Firm—Joseph N. Breaux

(57) ABSTRACT

A grasping implement that allows individuals to pick up items from the ground without the need for bending or stooping. The grasping implement includes a grasping jaw assembly, a handle assembly, and a jaw movement mechanism. The grasping jaw assembly includes first and second half-circular cross-sectional grasping jaws that are hingedly connected along two adjacent side edges and which can be closed around items with the jaw movement mechanism to grip and move them.

5 Claims, 4 Drawing Sheets

US 6,357,809 B1

GRASPING IMPLEMENT

TECHNICAL FIELD

The present invention relates to grasping implements for grasping items on the ground to transfer them to a disposal location such as a trash can and more particularly to a grasping implement that includes a grasping jaw assembly, a handle assembly, and a jaw movement mechanism; the grasping jaw assembly including first and second half-circular cross-sectional grasping jaws that are hingedly connected along two adjacent side edges with a jaw hinge assembly such that first and second grasping side edges of the first and second grasping jaws, respectively, are pivotal toward and away from each other when the first and second grasping jaws pivot along the jaw hinge assembly; the handle assembly including a rigid pole having a jaw connecting end rigidly connected to a center back surface of the first grasping jaw adjacent to the jaw hinge assembly; the jaw movement mechanism including a slide handle, a pivoting bar, an elongated jaw connecting rod, and a second grasping jaw connecting hinge; the pivoting bar having a pivot bar bottom end pivotally connected to the rigid pole of the handle assembly with a bar connecting bracket and a connecting rod connecting portion pivotally connected to the connecting rod with a pivot pin; the slide handle being slidably mounted on the rigid pole of the handle assembly and being in pivoting connection with a far end of the jaw connection rod with a connecting bracket and a pivot pin; the connecting rod having a jaw attachment end rigidly connected to a first hinge half of the second grasping jaw connecting hinge; the second grasping jaw connecting hinge being in rigid connection with an outer surface of the second grasping jaw such that as the slide handle slides away from the grasping jaw assembly the first and second grasping side edges of the first and second grasping jaws move away from each other and when the slide handle slides toward the grasping jaw assembly the first and second grasping side edges of the first and second grasping jaws move toward and into contact with each other. In a preferred embodiment one of the first and second grasping jaws is provided with an overlapping edge member that over laps the first and second grasping side edges when the first and second grasping jaws are in a closed position.

BACKGROUND ART

It can be difficult for some individuals to bend over to pick up items such as tree clippings, lawn debris, garbage and other items on the ground for transfer to another location such as a trash can or compost heap. It would be a benefit to these individuals to have a grasping device that included an elongated handle that allowed the individuals to pick up items from the ground without the need for bending or stooping. Because the items to be picked up are often located up against a wall, fence or other vertical structure, it would be a further benefit to have a grasping device that was physically configured to allow the user to grasp and move such items.

GENERAL SUMMARY DISCUSSION OF INVENTION

It is thus an object of the invention to provide a grasping implement that includes a grasping jaw assembly, a handle assembly, and a jaw movement mechanism; the grasping jaw assembly including first and second half-circular cross-sectional grasping jaws that are hingedly connected along two adjacent side edges with a jaw hinge assembly such that first and second grasping side edges of the first and second grasping jaws, respectively, are pivotal toward and away from each other when the first and second grasping jaws pivot along the jaw hinge assembly; the handle assembly including a rigid pole having a jaw connecting end rigidly connected to a center back surface of the first grasping jaw adjacent to the jaw hinge assembly; the jaw movement mechanism including a slide handle, a pivoting bar, an elongated jaw connecting rod, and a second grasping jaw connecting hinge; the pivoting bar having a pivot bar bottom end pivotally connected to the rigid pole of the handle assembly with a bar connecting bracket and a connecting rod connecting portion pivotally connected to the connecting rod with a pivot pin; the slide handle being slidably mounted on the rigid pole of the handle assembly and being in pivoting connection with a far end of the jaw connection rod with a connecting bracket and a pivot pin; the connecting rod having a jaw attachment end rigidly connected to a first hinge half of the second grasping jaw connecting hinge; the second grasping jaw connecting hinge being in rigid connection with an outer surface of the second grasping jaw such that as the slide handle slides away from the grasping jaw assembly the first and second grasping side edges of the first and second grasping jaws move away from each other and when the slide handle slides toward the grasping jaw assembly the first and second grasping side edges of the first and second grasping jaws move toward and into contact with each other. In a preferred embodiment one of the first and second grasping jaws is provided with an overlapping edge member that over laps the first and second grasping side edges when the first and second grasping jaws are in a closed position.

Accordingly, a grasping implement is provided. The grasping implement includes a grasping jaw assembly, a handle assembly, and a jaw movement mechanism; the grasping jaw assembly including first and second half-circular cross-sectional grasping jaws that are hingedly connected along two adjacent side edges with a jaw hinge assembly such that first and second grasping side edges of the first and second grasping jaws, respectively, are pivotal toward and away from each other when the first and second grasping jaws pivot along the jaw hinge assembly; the handle assembly including a rigid pole having a jaw connecting end rigidly connected to a center back surface of the first grasping jaw adjacent to the jaw hinge assembly; the jaw movement mechanism including a slide handle, a pivoting bar, an elongated jaw connecting rod, and a second grasping jaw connecting hinge; the pivoting bar having a pivot bar bottom end pivotally connected to the rigid pole of the handle assembly with a bar connecting bracket and a connecting rod connecting portion pivotally connected to the connecting rod with a pivot pin; the slide handle being slidably mounted on the rigid pole of the handle assembly and being in pivoting connection with a far end of the jaw connection rod with a connecting bracket and a pivot pin; the connecting rod having a jaw attachment end rigidly connected to a first hinge half of the second grasping jaw connecting hinge; the second grasping jaw connecting hinge being in rigid connection with an outer surface of the second grasping jaw such that as the slide handle slides away from the grasping jaw assembly the first and second grasping side edges of the first and second grasping jaws move away from each other and when the slide handle slides toward the grasping jaw assembly the first and second grasping side edges of the first and second grasping jaws move toward and into contact with each other. In a preferred embodiment one of the first and second grasping jaws is provided with an overlapping edge member that over laps the first and second grasping side edges when the first and second grasping jaws are in a closed position. The overlapping edge member can be provided with tines or teeth if desired and may also be positioned on either the interior or the exterior surfaces of the first and second side edges.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
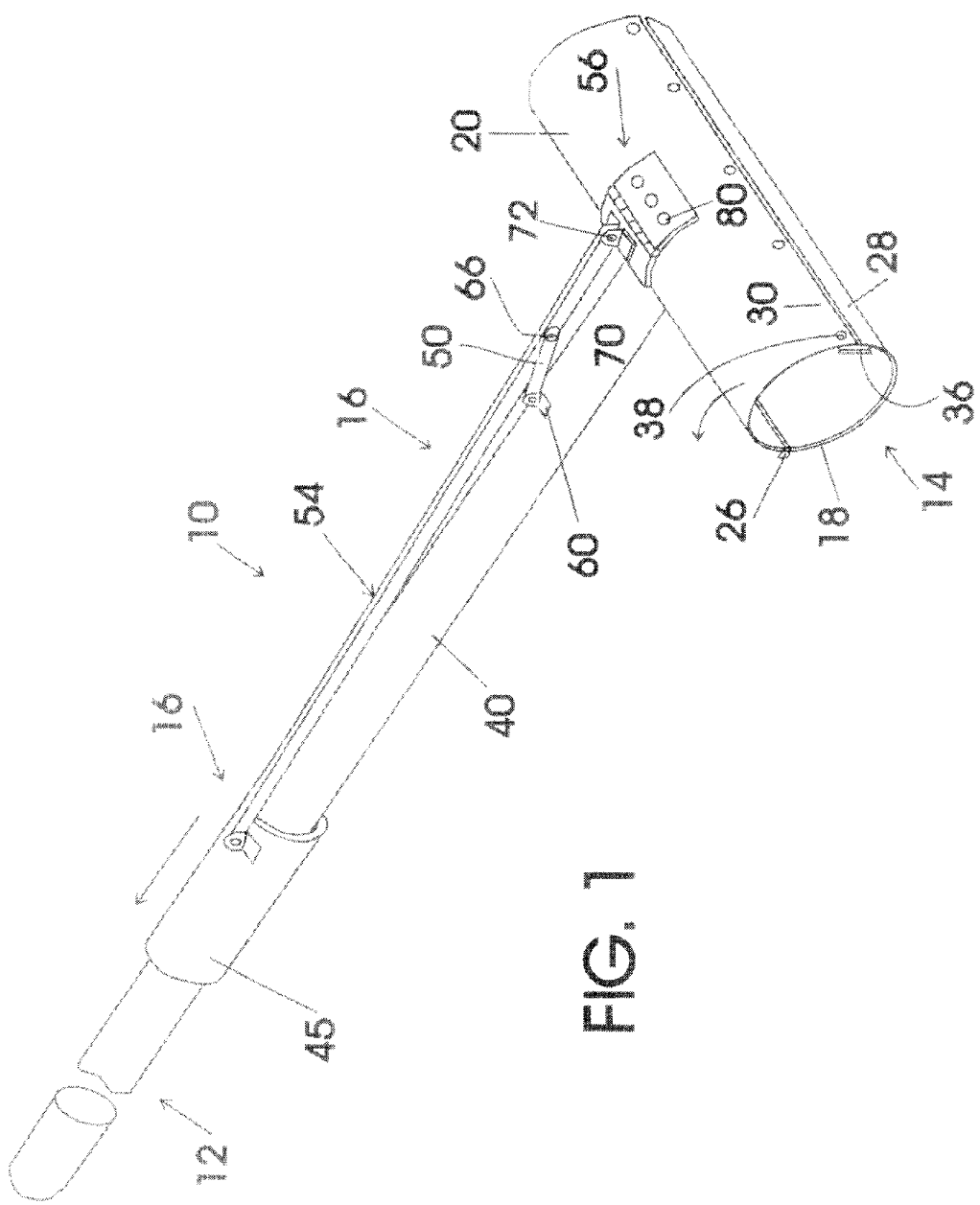
FIG. 1 is a perspective view of an exemplary embodiment of the grasping implement of the present invention showing the handle assembly, the grasping jaw assembly, and the jaw movement mechanism.
Figure 2:
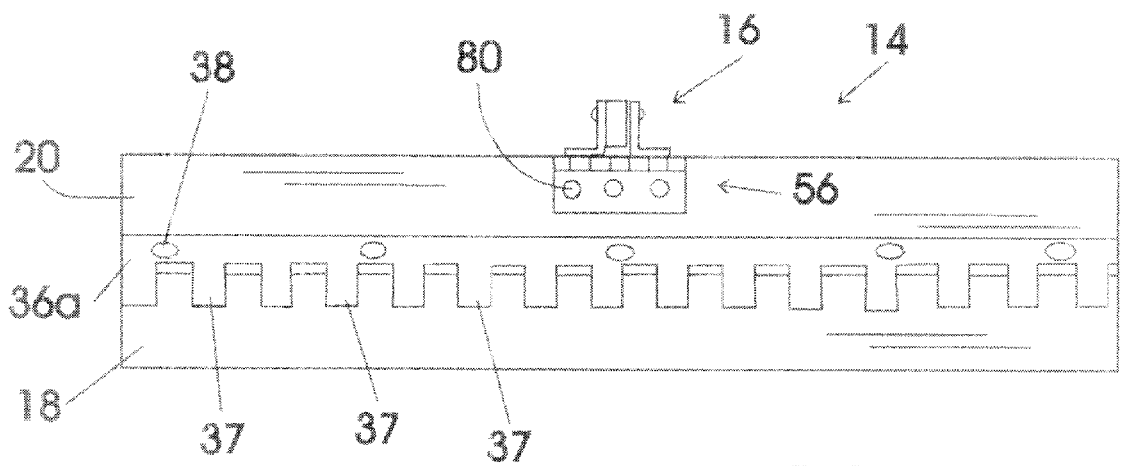
FIG. 2 is a front view of the grasping implement showing the grasping jaw assembly in the closed position.
Figure 3:
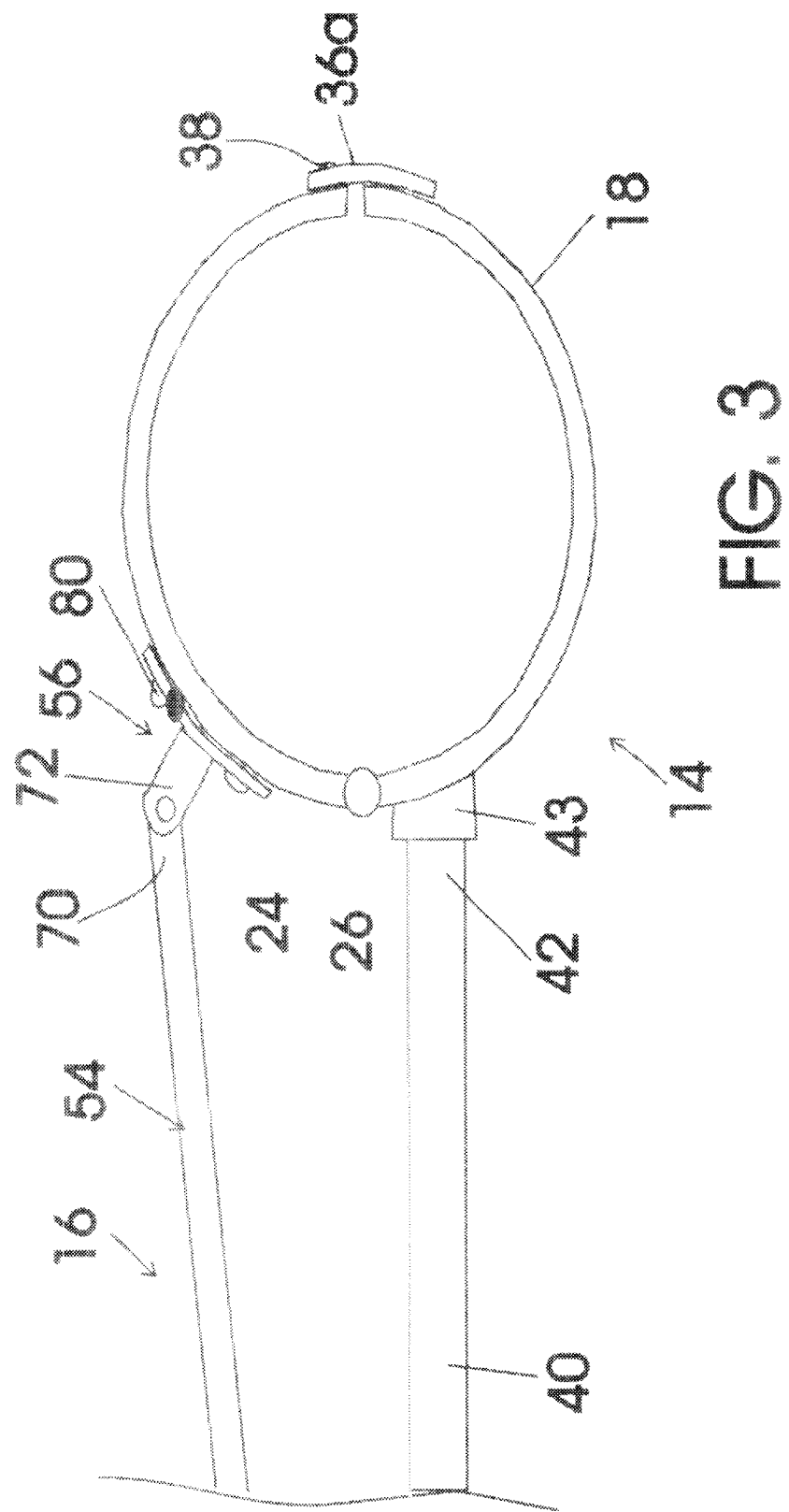
FIG. 3 is a partial side plan view of the grasping implement of FIG. 1 showing the grasping jaw assembly in the closed position with the connecting end of the jaw movement mechanism pushed down toward the grasping jaw assembly.

FIGS. 1–3 show various aspects of an exemplary embodiment of the grasping implement of the present invention generally designated 10. Grasping implement 10 includes a handle assembly, generally designated 12; a grasping jaw assembly, generally designated 14; and a jaw movement mechanism, generally designated 16. Grasping jaw assembly 14 includes first and second half-circular cross-sectional grasping jaws, generally designated 18,20 respectively, that are hingedly connected along two adjacent side edges 22,24 with a jaw hinge assembly 26 such that first and second grasping side edges 28,30 of first and second grasping jaws 18,20, respectively, are pivotal toward and away from each other when the first and second grasping jaws 18,20 pivot along jaw hinge assembly 26. In the embodiments shown, first and second grasping jaws 18,20 are formed from a section of plastic tubing that has been cut in half down the length thereof. Although plastic tubing has been used in these embodiment, metal or other rigid material may be used to construct first and second grasping jaws 18,20 without departing from the spirit of the invention taught herein.

Figure 4:
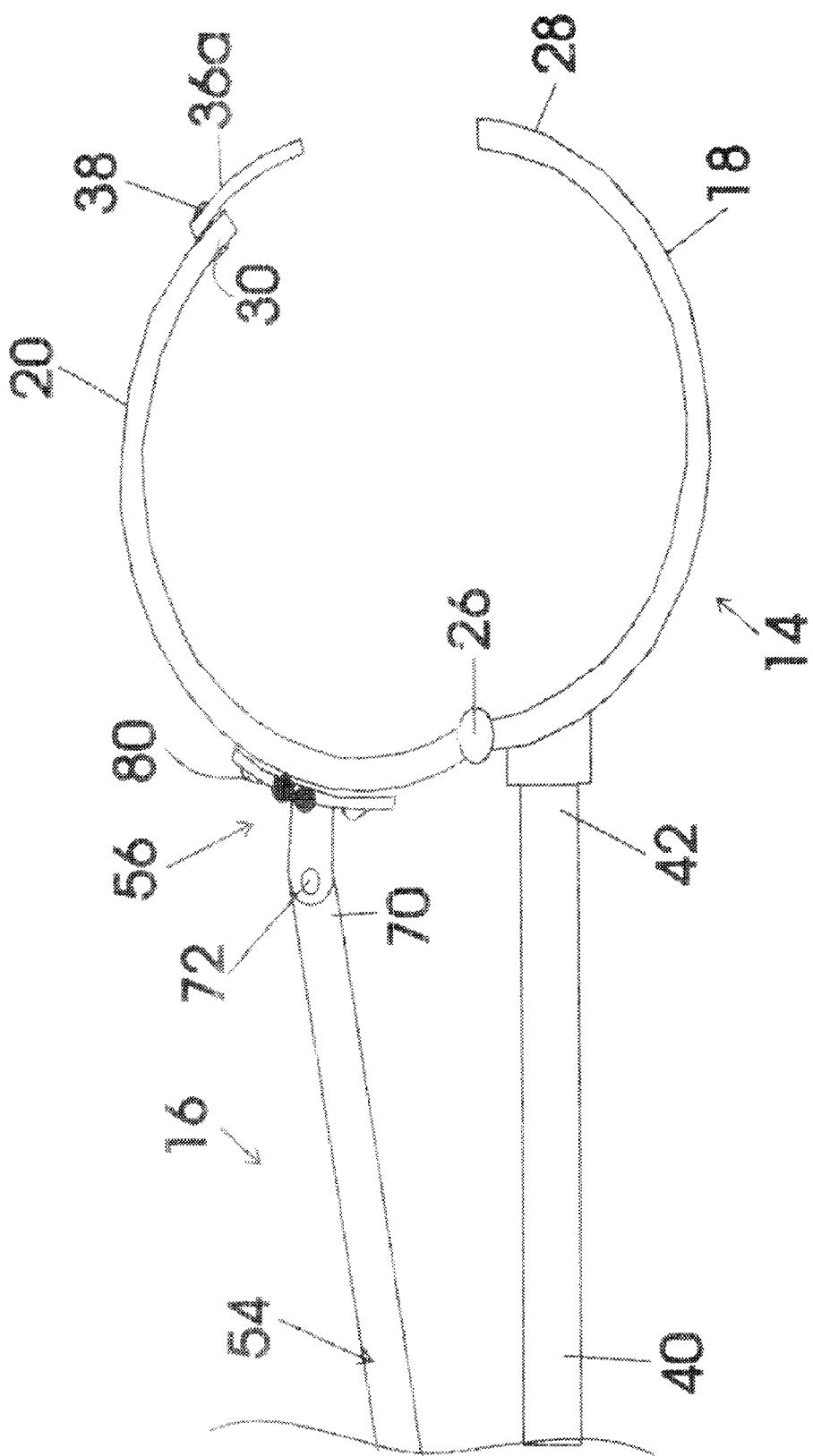
FIG. 4 is a partial side plan view of the grasping implement of FIG. 1 showing the grasping jaw assembly in the open position with the connecting end of the jaw movement mechanism pulled back in a direction away from the grasping jaw assembly.

In the embodiment shown in FIG. 1, second grasping jaw 20 is provided with an overlapping inner edge member 36 that overlaps the inner surfaces of first and second grasping side edges 28,30 when the first and second grasping jaws 18,20 are in a closed position. In the embodiment shown in FIGS. 2–4, second grasping jaw 20 is provided with an outer edge member 36a having spaced tines 37. Edge members 36 and 36a are each constructed from aluminum sheeting that is riveted to second grasping jaw 20 with rivets 38.

Handle assembly 12 includes a rigid wooden pole 40 having a jaw connecting end 42 rigidly connected to a center back surface 43 of first grasping jaw 18 adjacent to jaw hinge assembly 26. Jaw movement mechanism 16 includes a sliding handle 45; a pivoting bar 50; an elongated jaw connecting rod, generally designated 54; and a second grasping jaw connecting hinge, generally designated 56. Pivoting bar 50 has a pivot bar bottom end pivotally connected to rigid pole 40 of handle assembly 12 with a bar connecting bracket 60 and a connecting rod connecting portion pivotally connected to connecting rod 54 with a pivot pin 66. Slide handle 45 is slidably mounted on pole 40.

Connecting rod 54 has a jaw attachment end 70 rigidly connected to a first hinge half 72 of second grasping jaw connecting hinge 56. Second grasping jaw connecting hinge 56 is rigidly connected with an outer surface of second grasping jaw 20 with rivets 80 such that as slide handle 45 slides away from grasping jaw assembly 14, first and second grasping side edges 28,30 of first and second grasping jaws 18,20 move away from each other (shown in FIG. 4) and when slide handle 35 slides toward grasping jaw assembly 14, first and second grasping side edges 28,30 of first and second grasping jaws 18,20 move toward and into contact with each other (shown in FIGS. 1–3) closing around and gripping items such as leaves, twigs, garbage, etc. to be picked up and placed in a disposal bin or the like.

It can be seen from the preceding description that a grasping implement has been provided.

It is noted that the embodiment of the grasping implement described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A grasping implement comprising:

a grasping jaw assembly;

a handle assembly; and a jaw movement mechanism;

the grasping jaw assembly including first and second half-circular cross-sectional grasping jaws that are hingedly connected along two adjacent side edges with a jaw hinge assembly such that first and second grasping side edges of the first and second grasping jaws, respectively, are pivotal toward and away from each other when the first and second grasping jaws pivot along the jaw hinge assembly;

the handle assembly including a rigid pole having a jaw connecting end rigidly connected to a center back surface of the first grasping jaw adjacent to the jaw hinge assembly;

the jaw movement mechanism including a slide handle, a pivoting bar, an elongated jaw connecting rod, and a second grasping jaw connecting hinge;

the pivoting bar having a pivot bar bottom end pivotally connected to the rigid pole of the handle assembly with a bar connecting bracket and a connecting rod connecting portion pivotally connected to the connecting rod with a pivot pin;

the slide handle being slidably mounted on the rigid pole of the handle assembly and being in pivoting connection with a far end of the jaw connection rod with a connecting bracket and a pivot pin;

the connecting rod having a jaw attachment end rigidly connected to a first hinge half of the second grasping jaw connecting hinge;

the second grasping jaw connecting hinge being in rigid connection with an outer surface of the second grasping jaw such that as the slide handle slides away from the grasping jaw assembly, the first and second grasping side edges of the first and second grasping jaws move away from each other and when the slide handle slides toward the grasping jaw assembly, the first and second grasping side edges of the first and second grasping jaws move toward and into contact with each other.

2. The grasping implement of claim 1 wherein:

one of the first and second grasping jaws is provided with an overlapping edge member that overlaps the first and second grasping side edges when the first and second grasping jaws are in a closed position.

3. The grasping implement of claim 2 wherein:

the overlapping edge member overlaps inner surfaces of the first and second grasping side edges.

4. The grasping implement of claim 2 wherein:

the overlapping edge member is provided with tines.

5. The grasping implement of claim 2 wherein:

the overlapping edge member overlaps inner surfaces of the first and second grasping side edges.

* * * * *